Feb. 7, 1939. A. SCHROEDER 2,146,487
POWDER RECEPTACLE
Filed May 12, 1938
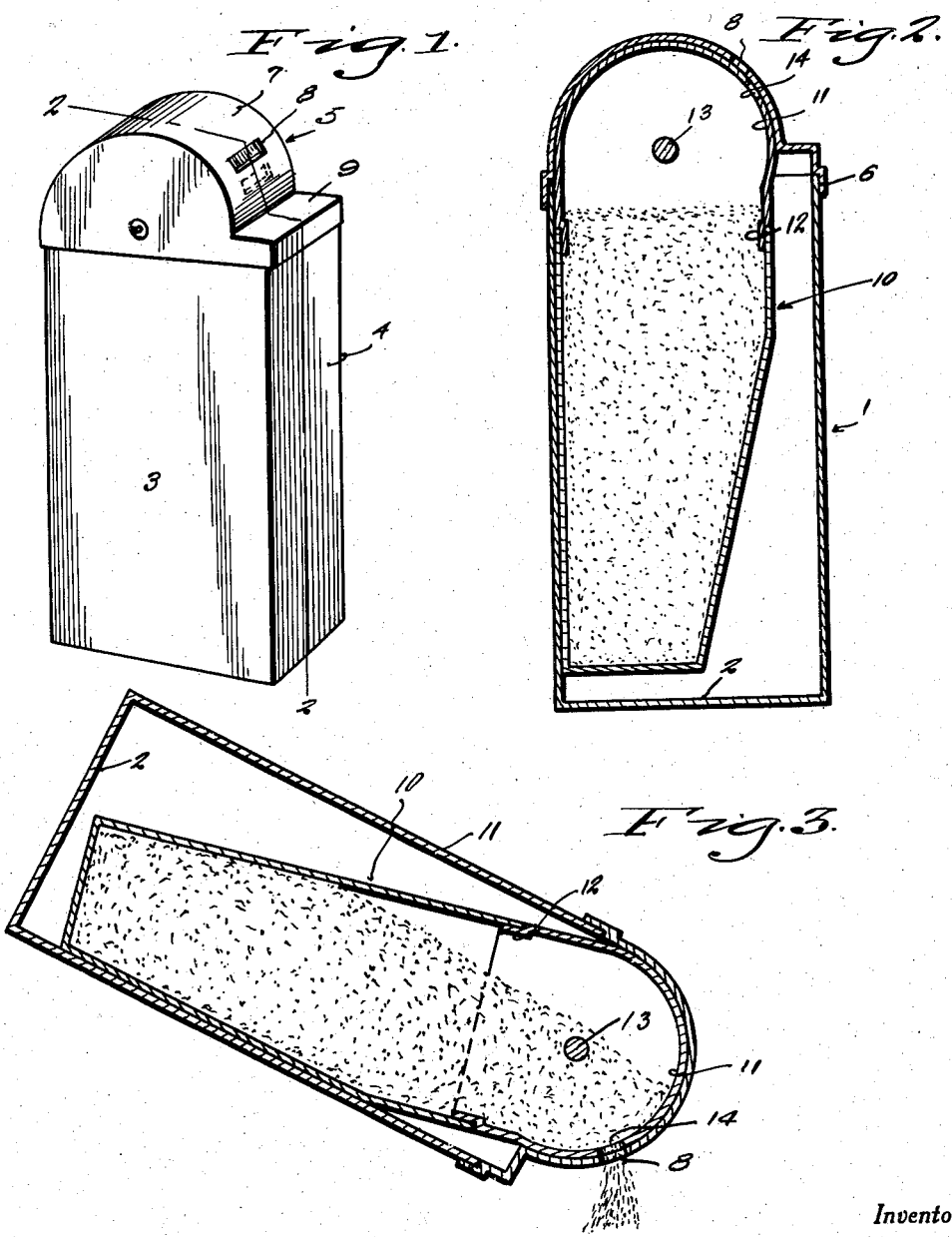
Inventor
Arthur Schroeder
By Clarence A. O'Brien
and Hyman Berman
Attorneys Patented Feb. 7, 1939

2,146,487

UNITED STATES PATENT OFFICE 2,146,487

POWDER RECEPTACLE

Arthur Schroeder, Philadelphia, Pa.

Application May 12, 1938, Serial No. 207,610

7 Claims. (Cl. 221—62)

This invention relates to receptacles for powder, either for dental or facial and body purposes, and has for the primary object, the provision of an efficient and inexpensive device of this character which when in an upright position will be closed to prevent entrance of foreign matter and when tilted for discharging its contents will automatically open to allow as much of the contents to discharge as desired.

Other objects and advantages of the invention will become more apparent as the specification proceeds.

With the aforesaid objects in view, the invention consists in the novel combination and arrangement of parts hereinafter described in their preferred embodiment, pointed out in the subjoined claims, illustrated in the annexed drawing, wherein like parts are designated by the same reference characters throughout the several views.

In the drawing:

Figure 1 is a perspective view illustrating a powder receptacle constructed in accordance with my invention.

Figure 2 is a sectional view taken on the line 2—2 of Figure 1.

Figure 3 is a sectional view similar to Figure 2 showing the receptacle in a tilted position for the purpose of discharging its contents.

Referring in detail to the drawing, the numeral 1 indicates a main or outer receptacle, consisting of a bottom wall 2, side walls 3 and end walls 4 all of which are of integral construction. The upper end of the receptacle 1 is fully open and is normally closed by a removable cover 5 having marginal flanges 6 to receive therein with a frictional fit the walls 3 and 4 of the main receptacle 1 to prevent accidental displacement of the cover from the receptacle. The cover is shaped to provide a semicylindrical portion 7 having a discharge slot 8 in its arcuately curved wall. The cover is also shaped to provide a flat horizontal wall or shelf 9 when the main receptacle 1 is in an upright position and is located adjacent the slot 8.

An inner receptacle 10 is located in the main receptacle 1 and has a general shape substantially similar to the shape of the main receptacle 1 except that one of the end walls thereof has a portion converging towards the opposite end wall to reduce the lower portion of the inner receptacle in size so that it may move towards and from the end walls of the main receptacle.

A cover 11 is provided for the inner receptacle and includes a semicylindrical portion having wiping contact with the semicylindrical portion 7 of the cover 5 and a portion shaped to match the shape of the upper portion of the inner receptacle and equipped with flanges 12 received in the inner receptacle with a frictional fit with the walls of the latter. A shaft 13 is carried by the outer cover 5 and has the inner cover journaled thereon so that the inner receptacle may have a pendulum movement within the outer or main receptacle. Powder of a selected kind is placed in the inner receptacle prior to its application to the inner cover. The weight of the inner receptacle and its contents maintains the inner receptacle in a perpendicular position when the outer or main receptacle is in an upright position. The semicylindrical portion of the inner cover 11 has a discharge slot 14 normally out of registration with the discharge slot 8 of the cover 5 when the main or outer receptacle is disposed vertically on a rest. However, when the main receptacle is tilted, as shown in Figure 3, the inner receptacle swings on the shaft 13 aligning the slot 14 of the inner cover with the slot 8 of the cover 5 so that the contents may discharge as clearly shown in Figure 3. A tooth brush or the like may be brought into engagement with the shelf 9 when the device is tilted as shown in Figure 3 so that the power or contents of the inner receptacle may discharge directly on the bristles of the brush. As soon as the outer receptacle is returned to a vertical position the inner receptacle swings on the shaft 13 and moves the discharge slot 14 out of alignment with the slot 8, consequently closing the interior of the inner receptacle to foreign matter.

From the foregoing description taken in connection with the accompanying drawing, it will be seen that a very efficient receptacle has been provided for containing powder or the like which will exclude foreign matter, moisture and the like from the powder when resting in a vertical position. Further, it will be noted that this receptacle will be self-opening when moved in a tilted position so that the powder or the contents can be easily obtained in amounts as desired.

Having thus described the invention, what I claim is:

1. A receptacle comprising inner and outer containers, covers for said containers and one fitting within the other and each having discharge slots normally out of registration when said containers are disposed vertically and adapted to register on the movement of the containers into a tilted position.

2. A receptacle comprising inner and outer containers, interfitting covers for said containers and rotatably connected together and having discharge slots normally out of registration when said containers are disposed vertically and adapted to register on the containers being moved into tilted position.

3. A receptacle comprising inner and outer containers with the inner container free to swing within the outer container, removable covers for said containers and including semicylindrical portions one fitting within the other and provided with discharge slots normally out of registration when said containers are disposed vertically and adapted to align on the containers being moved into tilted position, and means for rotatably connecting the covers.

4. A receptacle comprising inner and outer containers with the inner container free to swing within the outer container, removable covers for said containers and including semicylindrical portions one fitting within the other and provided with discharge slots normally out of registration when said containers are disposed vertically and adapted to align on the containers being moved into tilted position, a shaft secured to one of the covers and having the other cover journaled thereon.

5. A receptacle comprising inner and outer containers with the inner container free to swing within the outer container, removable covers for said containers and including semicylindrical portions one fitting within the other and provided with discharge slots normally out of registration when said containers are disposed vertically and adapted to align on the containers being moved into tilted position, a shaft secured to one of the covers and having the other cover journaled thereon, one of said covers having a wall closed at right angles to the wall of the outer container and located adjacent the slot of the respective cover to form a rest for a brush to bring the bristles thereof in close proximity to the last-named slots.

6. A receptacle comprising an outer container, a cover for said outer container and including a semicylindrical portion having a discharge slot and a shelf forming portion adjacent said slot, an inner container located within the outer container and movable therein, a cover for the inner container and including a semicylindrical portion having wiping contact with the semicylindrical portion of the first-named cover and provided with a discharge slot normally out of registration with the first-named discharge slot when said containers are disposed vertically and adapted to align with the first-named discharge slot on the tilting of said containers, and a shaft connecting the covers whereby the cover of the inner container may swing within the cover of the outer container.

7. A receptacle comprising a vertically arranged support, a container pivoted on said support to normally assume a vertical position, a cover for said container and having a discharge slot for dispensing material from said container by tilting said support, and a cover means carried by the support for closing the slot until relative movement between the support and container is had by the tilting of the support from a vertical position.

ARTHUR SCHROEDER.